(12) United States Patent
Jang (10) Patent No.: US 12,131,061 B2
(45) Date of Patent: Oct. 29, 2024

(54) MEMORY SYSTEM HAVING SYSTEM BUFFER AND METHOD OF STORING DATA BY USING THE SYSTEM BUFFER

(71) Applicant: SK hynix Inc., Icheon-si (KR)

(72) Inventor: In Jong Jang, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 43 days.

(21) Appl. No.: 17/506,931

(22) Filed: Oct. 21, 2021

(65) Prior Publication Data

US 2022/0334761 A1    Oct. 20, 2022

(30) Foreign Application Priority Data

Apr. 16, 2021    (KR) .......................... 10-2021-0049978

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC .... G06F 3/0656; G06F 3/0604; G06F 3/0679; G06F 2212/1032; G06F 2212/7203; G06F 2212/7209; G06F 12/0246; G06F 11/102; G06F 11/1048; G06F 11/1016; G06F 11/1032

See application file for complete search history.

(56) References Cited

U.S. PATENT DOCUMENTS

| | | | | |
|---|---|---|---|---|
| 7,865,805 B1* | 1/2011 | Gallagher | ........... | G06F 11/1076 714/773 |
| 2009/0271568 A1* | 10/2009 | Kwon | ..................... | G11C 16/10 714/763 |
| 2010/0162055 A1* | 6/2010 | Morita | ................. | G11C 7/1006 711/170 |
| 2018/0046541 A1* | 2/2018 | Niu | ....... | G06F 11/1068 |
| 2019/0004896 A1* | 1/2019 | Tokoyoda | ............... | G06F 12/06 |
| 2021/0193245 A1* | 6/2021 | Ryu | ....... | G11C 7/1057 |

FOREIGN PATENT DOCUMENTS

| | | |
|---|---|---|
| KR | 20150051641 A | 5/2015 |
| KR | 20180003692 A | 1/2018 |

* cited by examiner

*Primary Examiner* — Brian R Peugh
(74) *Attorney, Agent, or Firm* — Perkins Coie LLP (57) ABSTRACT

Memory systems and operating methods of the memory systems are disclosed. In an implementation, a memory system includes a system buffer including buffer areas to which addresses are allocated, and configured to store data in the buffer areas, and a buffer manager configured to designate an address of a buffer area in which a defect occurs as a defect address by comparing a first parity bit for data stored in the system buffer with a second parity bit that is obtained by a computation based on the data stored in the system buffer, and block access to the buffer area designated as the defect address.

20 Claims, 11 Drawing Sheets

| ADD | DATA | 1PT_B | 2PT_B | FG_B |
|---|---|---|---|---|
| A1 | 1 0 0 1 0 1 0 0 | 1 | 1 | 0 |
| A2 | 0 0 0 0 0 0 1 0 | 1 | 1 | 0 |
| A3 |  |  |  |  |
| A4 |  |  |  |  |
| A5 | 0 0 0 0 0 0 0 0 | 0 | 0 | 0 |
| A6 | 1 1 1 1 1 1 1 0 | 1 | 1 | 0 |
| A7 | 0 1 0 1 0 1 0 1 | 0 | 0 | 0 |

1DATA → A1
2DATA → A2
(skip) D_ADD → A3
(skip) D_ADD → A4
3DATA → A5
4DATA → A6
5DATA → A7

MEMORY SYSTEM HAVING SYSTEM BUFFER AND METHOD OF STORING DATA BY USING THE SYSTEM BUFFER

CROSS-REFERENCE TO RELATED APPLICATION

This patent document claims the priority and benefits of the Korean patent application number 10-2021-0049978, filed Apr. 16, 2021, which is incorporated herein by reference in its entirety.

TECHNICAL FIELD

The technology disclosed in this patent document relates to memory systems and their operating method, and more particularly, to a memory system having a system buffer that can store an address of the system buffer, and a method of operating the memory system.

BACKGROUND

Memory systems may include memory devices, controllers and system buffers. The memory devices are used to store user data, and the controllers are used to control the operations of the memory device.

Memory systems may include, as the memory device, volatile memory devices, non-volatile memory devices, or a combination of volatile memory devices and non-volatile memory devices. The volatile memory device is typically faster than nonvolatile memory, but only retains its data while the device is powered and loses its data when power is lost. In contrast, the non-volatile memory device retains stored data even in the absence of power supply and thus does not lose its data when power is lost. In addition, the non-volatile memory device can be highly integrated on a semiconductor chip.

SUMMARY

The embodiments of the disclosed technology relate to a memory system that includes a system buffer that can maintain address information where an error occurs in the system buffer, and a method of operating the memory system.

In an embodiment of the disclosed technology, a memory system includes a system buffer including buffer areas to which addresses are allocated, and configured to store data in the buffer areas, and a buffer manager configured to designate an address of a buffer area in which a defect occurs as a defect address by comparing a first parity bit for data stored in the system buffer with a second parity bit that is obtained by a computation based on the data stored in the system buffer, and block access to the buffer area designated as the defect address.

In an embodiment of the disclosed technology, a memory system includes a system buffer including buffer areas configured to store data to be forwarded or accessed, wherein addresses are allocated to the buffer areas, and a buffer manager configured to detect an address that includes a defect using a parity or a hamming code for data written to the system buffer, or using the hamming code that uses the parity, and block access to the detected address.

In an embodiment of the disclosed technology, a method of operating a memory system includes generating a first parity bit for data before being stored in a system buffer, storing the data in the system buffer, generating a second parity bit for the data stored in the system buffer, and labeling an address, among addresses allocated to the system buffer, as a defect address when the address has a value of the second parity bit that is different from a value of the first parity bit.

In an embodiment of the disclosed technology, a memory system includes a system buffer including buffer areas to which addresses are allocated, and configured to store data in the buffer areas, and a buffer manager configured to designate an address of a buffer area in which a defect occurs among the buffer areas as a defect address, and block access of the buffer area labeled as the defect address, using a first parity bit for data written to the system buffer and a second parity bit for data written to the system buffer.

In an embodiment of the disclosed technology, a memory system includes a system buffer including buffer areas to which addresses are allocated, and configured to store data in the buffer areas, and a buffer manager configured to detect an address where a defect occurs using a parity or a hamming code for data written to the system buffer, or using the hamming code according to a result of using the parity, and block access of the detected address In an embodiment of the disclosed technology, a method of operating a memory system includes generating a first parity bit for data before being stored in a system buffer, storing the data in the system buffer, generating a second parity bit for the data stored in the system buffer, and designating a detected address as a defect address when an address where a value of the second parity bit is different from a value of the first parity bit is detected among addresses allocated to the system buffer.

The present technology may improve reliability of the system buffer by inhibiting a use of an address where a defect occurs in the system buffer.

DETAILED DESCRIPTION

Specific structural features or functions for certain embodiments disclosed in this patent document are examples only and implementations of the disclosed technology are not limited to those specific examples.

System buffer may be used to store system data to be forwarded to or accessed by a memory system. For example, the system data may include an address map table, user data, or other information that can be used for operations between a host and the memory device. The address map table may include a mapping table for mapping a logical address used by the host to a physical address in the memory device. The system buffer may include a volatile memory, a nonvolatile memory, or a combination of a volatile memory and a nonvolatile memory.

The controller may temporarily store data received from the host or the memory device in the system memory, and may temporarily store data generated inside the controller in the system buffer.

Figure 1:
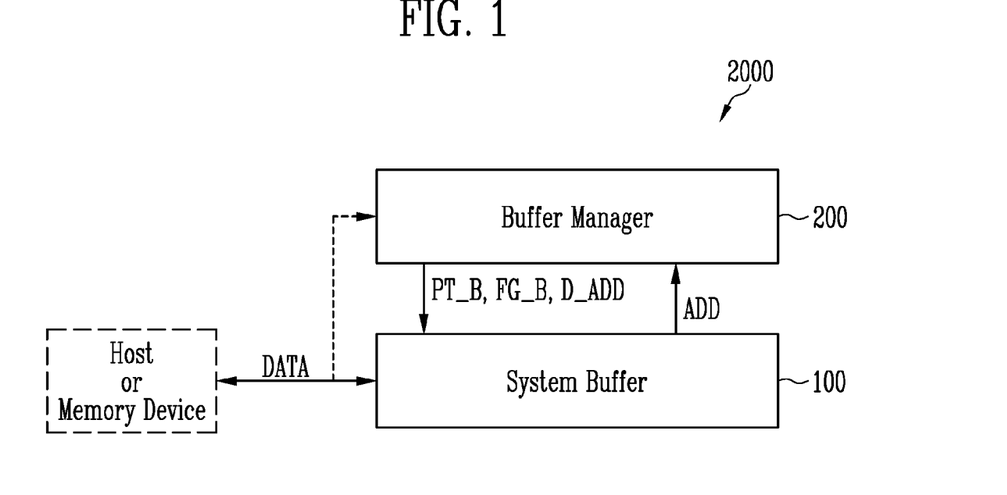
FIG. 1 is a diagram illustrating an example of a memory system based on an embodiment of the disclosed technology.

FIG. 1 is a diagram illustrating an example of a memory system based on an embodiment of the disclosed technology.

Referring to FIG. 1, the memory system 2000 may include a system buffer 100 and a buffer manager 200.

The system buffer 100 may be configured to store data DATA used in the memory system 2000 and output the stored data DATA. The data may include an address map table, user data and other information that can be used by a host and a memory device. The address map table may include addresses that are used to map logical addresses used by the host to physical addresses in the memory device. The system buffer 100 may be configured to include a volatile memory or a nonvolatile memory, or a structure that includes both the volatile memory and nonvolatile memory. For example, the system buffer 100 may be configured to include a static random access memory (SRAM), a dynamic random access memory (DRAM), a NAND memory, or a combination of any of the above.

The buffer manager 200 may be configured to generate one or more parity bits to encode the data DATA and write the encoded data to the system buffer 100. The buffer manager 200 may detect an error that may occur in the system buffer 100 by performing an operation using the parity. For example, the buffer manager 200 may generate a parity bit PT_B to encode the data DATA output from the host or the memory device, and then store the encoded data (e.g., a combination of the data DATA and the parity bit PT_B) in the system buffer 100. The buffer manager 200 may regenerate the parity bit of the data DATA stored in the system buffer 100 to compare the previously generated parity bit PT_B with the regenerated parity bit and generate a flag bit FG_B as a comparison result. The flag bit FG_B is stored in the system buffer 100. Upon receiving, from the system buffer 100, an address ADD corresponding to a predefined bit of the flag bits FG_B, the buffer manager 200 may count the number of the addresses ADD corresponding to the predefined bit. When the number of addresses corresponding to the predefined bit is equal to or greater than a reference number, the buffer manager 200 may output such addresses as defect addresses D_ADD. In some implementations, the defect address D_ADD may include an address of a buffer area that fails to store data as desired by a system or a user. For example, when a certain buffer area keeps providing the same data, the corresponding address is labeled as the defect address D_ADD. For example, in a case that a user keeps reading out data "1" or data "0" from a certain buffer area, the address of the buffer area may be labeled as a defect address D_ADD.

In some implementations of the disclosed technology, when the system buffer 100 is accessed, the address labeled as the defect address D_ADD may be blocked from access for a subsequent operation.

In some implementations of the disclosed technology, the buffer manager 200 may detect defective addresses of memory area based on the fact that a data bit read out from a certain memory area does not change despite of subsequent writing operations with a different data bit, such an address is labeled as the defect address D_ADD to prevent subsequent writing operations on the corresponding memory area. After blocking access to the defect address D_ADD, the buffer manager 200 may replace the defect address D_ADD with an address of another buffer area to store the corresponding data in that buffer area instead of the buffer area corresponding to the defect address D_ADD.

In some implementations, the system buffer 100 and the buffer manager 200 may be configured as discussed below.

Figure 2:
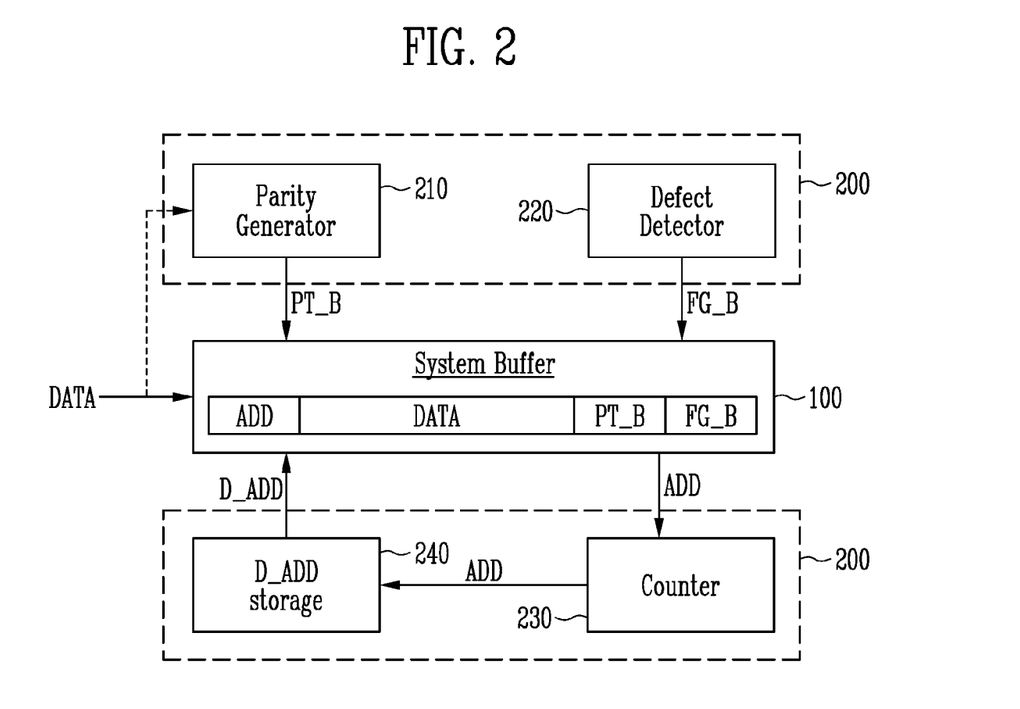
FIG. 2 is a diagram illustrating an example of a system buffer and a buffer manager based on an embodiment of the disclosed technology.

FIG. 2 is a diagram illustrating an example of a system buffer and a buffer manager based on an embodiment of the disclosed technology.

Referring to FIG. 2, the system buffer 100 may be configured to store the data DATA used in the memory system, the address ADD, the parity bit PT_B and the flag bit FG_B of the data DATA identified by each address ADD. For example, the data DATA stored in the system buffer 100 may include the address map table for mapping the logical address to the physical address. The data DATA may also include other data that can be used by the host or the memory device. The address ADD stored in the system buffer 100 may be used to locate where data is stored in the system buffer 100. The parity bit PT_B may be used to encode data DATA that is stored at each address ADD, and may have a value of 0 or 1 depending on the number of 0s or 1s included in the data DATA. For example, when the data DATA stored at the same address ADD includes an odd number of 1s, the parity bit PT_B may be 1, and when the data DATA includes an even number of 1s or when the data DATA does not include 1, the parity bit PT_B may be 0. Alternatively, the parity bit PT_B may be generated based on the number of 0s included in the data DATA. The computations associated with the parity bit PT_B may be performed in various methods using an algorithm stored in a parity generator 210.

The buffer manager 200 may include the parity generator 210, a defect detector 220, a counter 230, and a defect address storage (D_ADD storage) 240.

The parity generator 210 may be configured to generate the parity bit PT_B by extracting the parity bit from the data DATA written to the system buffer 100. For example, the parity generator 210 may generate the parity bit PT_B that has "0" value or "1" value depending on the number of 0s or 1s included in the data DATA written to the system buffer 100. In an example implementation where whether the parity bit PT_B is "0" or "1" is determined based on the number of 1s included in the data DATA, the parity generator 210 may generate "1" value as the parity bit PT_B when the data DATA includes an odd number of 1s, and generate "0" value as the parity bit PT_B when the data DATA includes an even number of 1s or when the data DATA does not include 1.

The defect detector 220 may be configured to detect an error bit included in the data DATA written to the system buffer 100. The defect detector 220 may be configured to perform a computation to extract the parity bit from the data DATA written to the system buffer 100 and generate the flag bit FG_B based on the comparison between the parity bit PT_B stored in the system buffer 100 with the parity bit that is obtained or extracted by a re-calculation or to generate the flag bit FG_B based on a computation using a hamming code. For example, when the parity bit PT_B obtained by the parity generator 210 and the parity bit obtained by the defect detector 220 are the same, the defect detector 220 may output "0" value as the flag bit FG_B, and when the parity bits are different from each other, the defect detector 220 may output "1" value as the flag bit FG_B. The flag bit FG_B output from the defect detector 220 may be stored in the system buffer 100. Logical operations using the parity bit may be used to detect the address ADD where there are an odd number of error bits. In one example, logical operations based on the hamming code may be used to detect the address ADD where a plurality of error bits occurs.

The counter 230 may be configured to count a number of the address ADD where the flag bit FG_B in the system buffer 100 is 1. For example, the counter 230 may store the address ADD where the flag bit FG_B is 1, and increase the count by 1 whenever the flag bit FG_B of the stored address ADD becomes 1. The counter 230 may output an address as a detected address ADD when the count associated with that address is equal to or greater than the reference number.

The defect address storage 240 may be configured to store the address ADD output from the counter 230 and label the stored address ADD as the defect address D_ADD. The disclosed technology can be implemented in some embodiments to block access to the address ADD labeled as the defect address D_ADD in the system buffer 100. Therefore, when there is an attempt to write the data DATA to the defect address D_ADD in a subsequent operation, access to the address ADD labeled as the defect address D_ADD is blocked, and the defect address D_ADD may be replaced with another address corresponding to another buffer area that does not include a defect.

Figure 3:
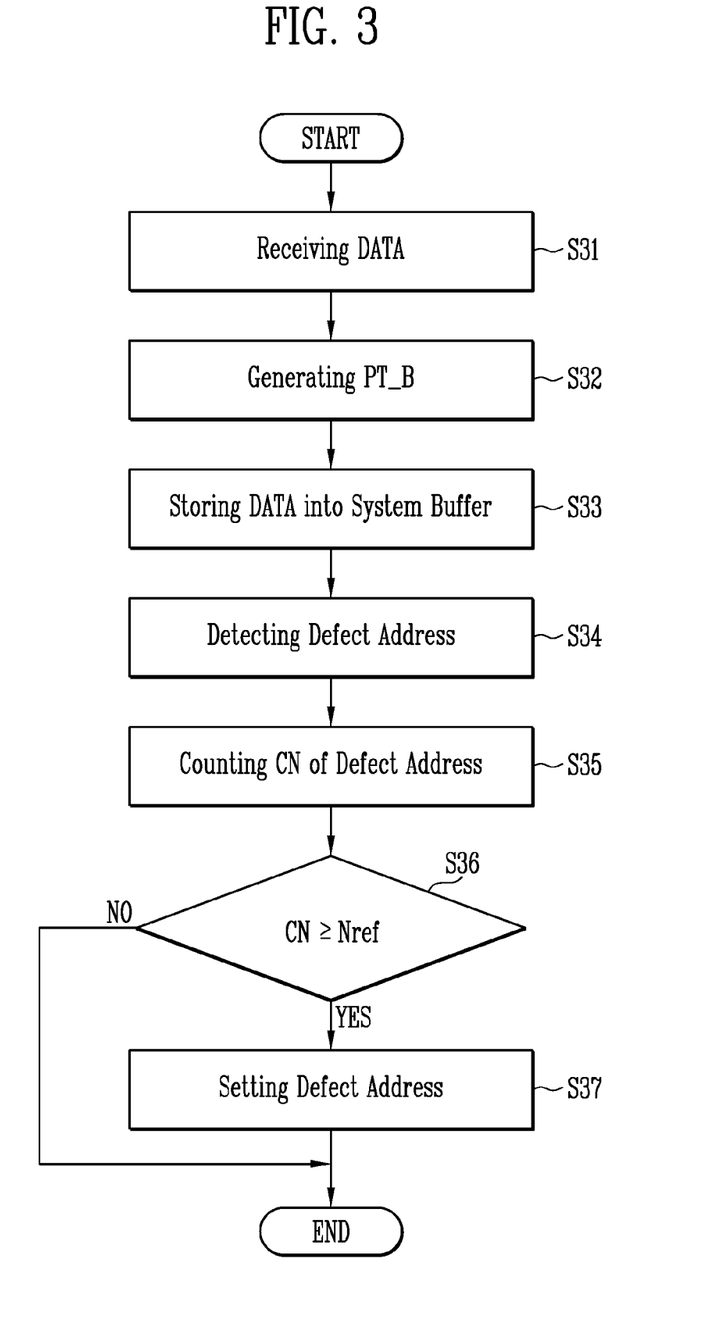
FIG. 3 is a flowchart illustrating an example method of operating a memory system based on an embodiment of the disclosed technology.

FIG. 3 is a flowchart illustrating an example method of operating a memory system based on an embodiment of the disclosed technology.

Referring to FIGS. 2 and 3, upon receipt of the data DATA at the memory system (S31), the parity bit PT_B for the received data DATA may be generated (S32). For example, the parity generator 210 may generate the parity bit PT_B by operating the parity for the data DATA written to the memory system. The data DATA and the parity bit PT_B generated by the parity generator 210 may be stored in the system buffer 100 (S33).

The defect detector 220 may detect the data DATA with a defect in the system buffer 100 and detect an address allocated to the corresponding data DATA (S34). For example, the defect detector 220 may detect the address ADD including the error bit using the parity bit or the hamming code for the data DATA stored in the system buffer 100. Logical operations using only one parity bit allow the error bit detection to be done more quickly. However, logical operations using the hamming code allow the error bit detection to be done more accurately. The defect detector 220 may store a flag bit indicating that there is a defect in the address ADD where the error bit occurs, and store a flag bit indicating that there is no defect in the address ADD where the error bit does not occur. For example, the flag bit indicating that there is a defect may be set to 1, and the flag bit indicating that there is no defect may be set to 0.

Subsequently, a count or number CN of the defect address is obtained (S35). For example, the counter 230 may store the address that includes the error bit according to the flag bit stored in the system buffer 100 and count the number of the stored address (CN).

The counter 230 may compare the count CN of the stored address with a reference number Nref (S36). For example, the counter 230 may determine whether the count CN is equal to or greater than the reference number Nref. The reference number Nref may be set to a natural number greater than or equal to 1. For example, the reference number Nref may be set to 1 to avoid using an address so long as that address has been detected as including an error bit. As another example, the reference number Nref may be set to a number that is greater than 1 to allow an address that has been detected as including an error bit to be used until the count reaches the reference number Nref. That is, the reference number Nref may be set based on the maximum error correction capability of the system buffer 100.

At S36, when the count CN is less than the reference number Nref (NO), a defect address detection operation may be terminated without setting the defect address.

At S36, when the count CN is equal to or greater than the reference number Nref is detected (YES), the defect address storage 240 may label the corresponding address ADD as the defect address D_ADD, and block access to the address ADD labeled as the defect address D_ADD (S37). Since the defect address D_ADD is the address ADD where the error bit occurs in the system buffer 100, the system buffer 100 may block access to the buffer area labeled as the defect address D_ADD in a subsequent operation, improving the reliability of the system buffer 100.

The defect address detection operation described with reference to FIG. 3 is more specifically described as follows.

Figure 4:
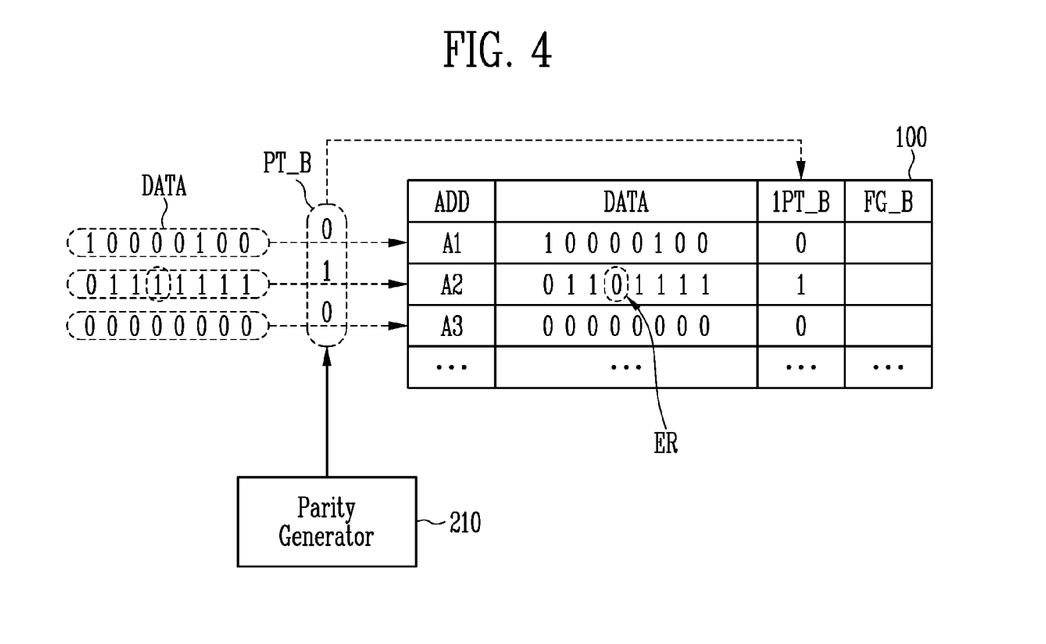
FIG. 4 is a diagram illustrating an example method of generating a parity bit of data based on an embodiment of the disclosed technology.

FIG. 4 is a diagram illustrating an example method of generating a parity bit of data based on an embodiment of the disclosed technology. FIG. 4 may correspond to S31 to S33 of FIG. 3.

Referring to FIG. 4, upon receipt of the data DATA at the memory system, the parity generator 210 may generate a first parity bit 1PT_B of the data DATA before the data DATA is written to the system buffer 100. For example, the parity generator 210 may generate the first parity bit 1PT_B of the data DATA written to the buffer areas for each address of the system buffer 100, and store the generated first parity bit 1PT_B in the buffer area corresponding to each address ADD.

For example, when data DATA 10000100 is written to the buffer area corresponding to a first address A1 of the system buffer 100, the parity generator 210 may generate the first parity bit 1PT_B corresponding to the first address A1 by counting the number of "1" bits included in the received data DATA. Since the number of "1" bits included in the data DATA 10000100 is two, the first parity bit 1PT_B corresponding to the first address A1 is 0. Therefore, the data DATA 10000100 and the first parity bit 1PT_B 0 may be stored in the buffer area corresponding to the first address A1.

For example, when data DATA 01111111 is written to the buffer area corresponding to a second address A2 of the system buffer 100, the parity generator 210 may generate the first parity bit 1PT_B corresponding to the second address A2 by counting the number of "1" bits included in the received data DATA. Since the number of "1" bits included in the data DATA 01111111 is seven, the first parity bit 1PT_B corresponding to the second address A2 is 1. Therefore, the data DATA 01111111 and the first parity bit 1PT_B 1 may be stored in the buffer area corresponding to the second address A2. However, when a defect exists in the buffer area corresponding to the second address A2, the data stored in the buffer area corresponding to the second address A2 includes an error bit ER. For example, when a defect occurs in a fourth buffer among a plurality of buffers allocated to the second address A2, the fourth bit of the original data "01111111" changes from "1" to "0." In this case, the data DATA corresponding to the second address A2 that is stored in the system buffer 100 is forwarded to the buffer area and the corrupted data "01101111" is stored in the buffer area, and the value "1" of the first parity bit 1PT_B generated by the parity generator 210 is also stored as it is.

When a defect does not exist in the buffer area corresponding to a third address A3, data DATA 00000000 written to the system buffer 100 may be stored as it is in the buffer area corresponding to the third address A3. Since data of 1 bit does not exist in the data DATA 00000000, the first parity bit 1PT_B is 0.

The disclosed technology can be implemented in some embodiments to determine the existence of the error bit ER in the second address A2 as will be discussed below with reference to FIGS. 5A and 5B.

Figure 5A:
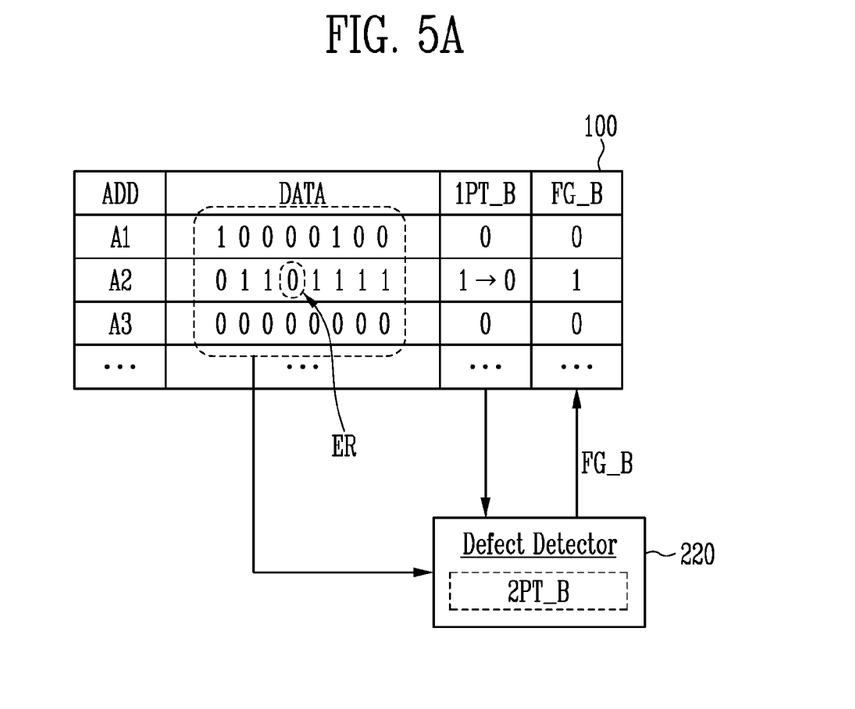
FIGS. 5A and 5B are diagrams illustrating examples of how to detect a defect address based on an embodiment of the disclosed technology.
Figure 5B:
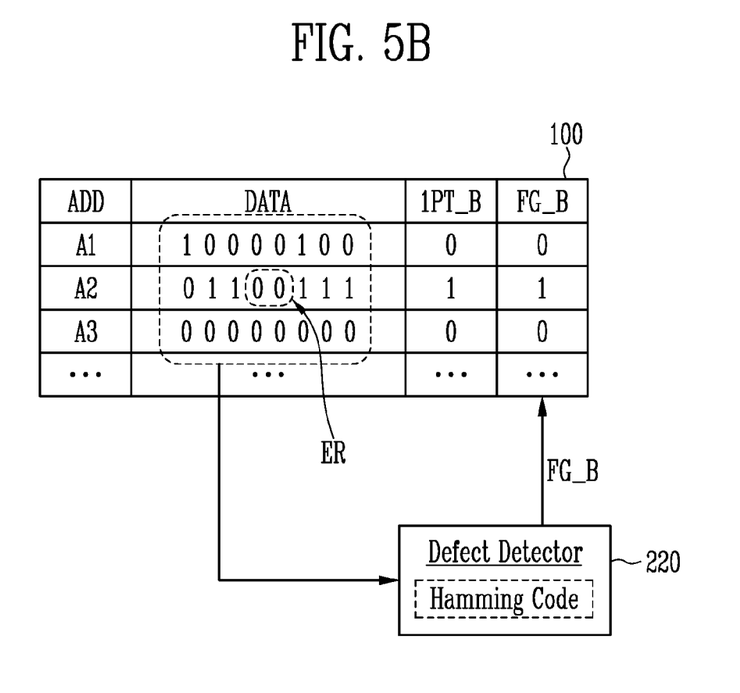

FIGS. 5A and 5B are diagrams illustrating examples of how to detect a defect address based on an embodiment of the disclosed technology. FIGS. 5A and 5B may correspond to S34 of FIG. 3.

Referring to FIG. 5A, the defect detector 220 may generate a second parity bit 2PT_B for the data DATA stored in the system buffer 100. For example, the defect detector 220 may perform a computation to obtain the second parity bit 2PT_B of the data DATA stored in the system buffer 100 for each address, and compare the second parity bit 2PT_B, which is obtained by a computation, with the first parity bit 1PT_B stored in the system buffer 100. The defect detector 220 may store "0" as the flag bit FG_B to indicate there is no defect with respect to an address where the first parity bit 1PT_B and the second parity bit 2PT_B are the same, and may store "1" as the flag bit FG_B to indicate there is defect with respect to an address where the first parity bit 1PT_B and the second parity bit 2PT_B are different from each other. In the example illustrated in FIG. 5A, since the first parity bit 1PT_B of the second address A2 is changed from "1" to "0" that is the second parity bit 2PT_B, the flag bit FG_B of the second address A2 becomes "1," which represents the existence of defects.

Referring to FIG. 5B, the defect detector 220 based on some embodiments of the disclosed technology may use the hamming code to more accurately detect a defect of the system buffer 100. For example, when the error bits ER of two or more bits are included in the buffer area corresponding to the second address A2 (e.g., the number of error bits ER is an even number), a single parity bit is not able to detect the error bits ER as described with reference to FIG. 5A, and thus the hamming code may be used to detect the error bits ER. For example, the defect detector 220 may additionally perform the defect address detection operation, using the hamming code, on the addresses where the flag bit indicating that there is no defect is generated by the defect address detection operation described with reference to FIG. 5A. Alternatively, the defect detector 220 may be configured to detect the error bit ER using only the hamming code.

Figure 6:
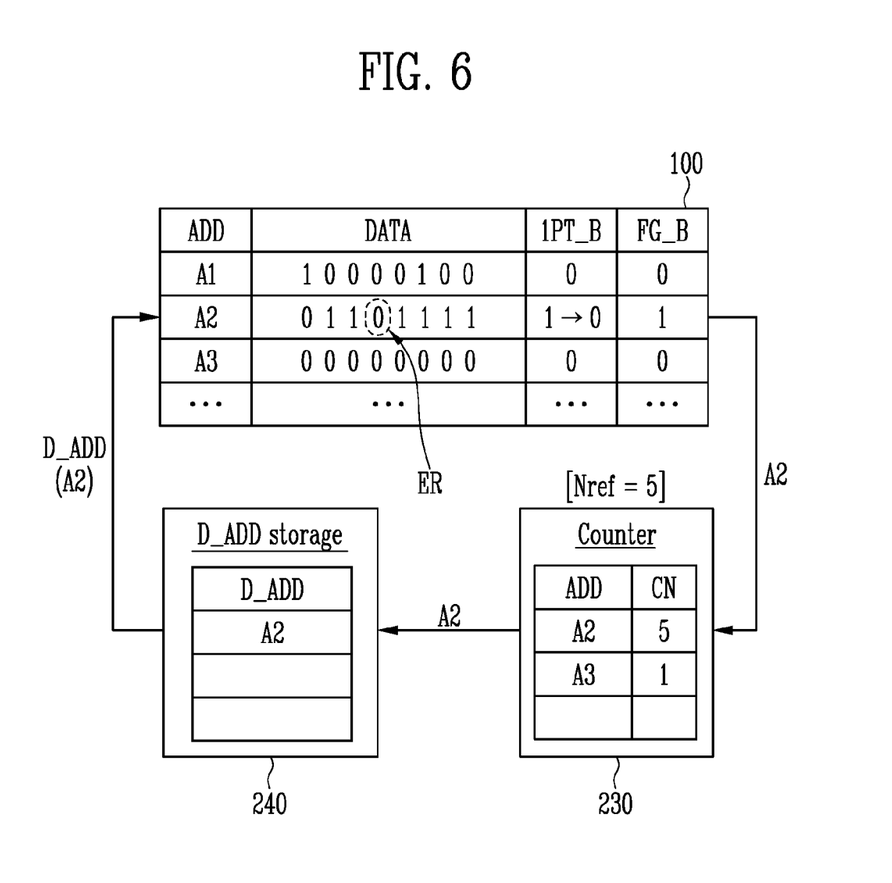
FIG. 6 is a diagram illustrating an example method of indicating the defect address based on an embodiment of the disclosed technology.

FIG. 6 is a diagram illustrating an example method of indicating the defect address based on an embodiment of the disclosed technology. FIG. 6 may correspond to S35 to S37 of FIG. 3.

Referring to FIG. 6, the counter 230 may store the address ADD and the count CN based on the flag bit FG_B of the system buffer 100. For example, the counter 230 may store the address ADD where the flag bit FG_B stored in the system buffer 100 indicating that there is defect, and accumulate and increase the count CN each time the address ADD stored in the defect address detection operation is detected. For example, assuming that the reference number Nref stored in the counter 230 is 5, in the defect address detection operation, when the number of the third address A3 is 1 and the number of the second address A2 is 5, the counter 230 may output the second address A2.

The defect address storage 240 may store the address ADD output from the counter 230 and output the defect address D_ADD corresponding to the stored address. For example, when the second address A2 is output from the counter 230, the defect address storage 240 may store the second address A2 as the defect address D_ADD, and output the defect address D_ADD corresponding to the second address A2 to the system buffer 100. When the defect address D_ADD corresponding to the second address A2 is written to the system buffer 100, data input/output of the buffer area corresponding to the second address A2 of the system buffer 100 is inhibited.

Figure 7:
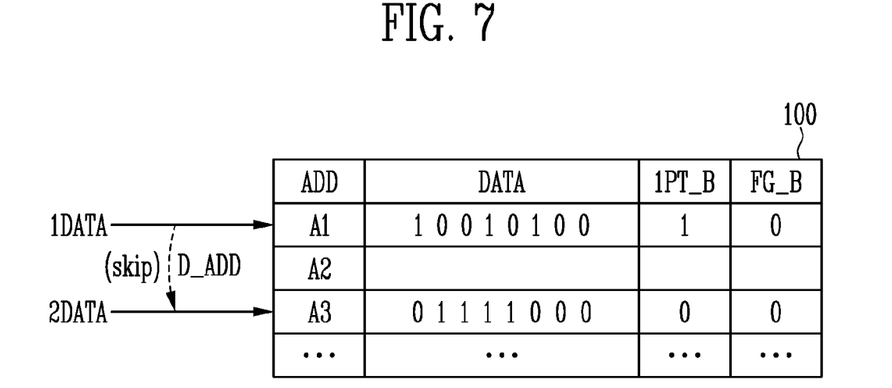
FIG. 7 is a diagram illustrating an example method of writing data to a system buffer in a case that the corresponding address is the defect address based on an embodiment of the disclosed technology.

FIG. 7 is a diagram illustrating an example method of writing data to the system buffer in a case that the corresponding address is the defect address based on an embodiment of the disclosed technology.

Referring to FIGS. 6 and 7, when the second address A2 of the system buffer 100 is labeled as the defect address D_ADD, the data DATA that is written to the system buffer 100 in a subsequent operation may be sequentially written to remaining addresses except for the second address A2. For example, first data 1DATA corresponding to the first address A1 may be stored in the buffer area to which the first address A1 is allocated, and second data 2DATA following the first data 1DATA may be stored in the buffer area to which the third address A3 (not the second address A2) is allocated. That is, after the second address A2 in the system buffer 100 is labeled as the defect address D_ADD in the system buffer 100, the second address A2 may be omitted and the remaining addresses are selected for data input/output operations. In other words, the second address A2 labeled as the defect address D_ADD may be replaced with the third address A3.

The address ADD labeled as the defect address D_ADD can be blocked from access as discussed below. In one example, an address allocation of the buffer area that is labeled as the defect address D_ADD in the system buffer 100 may be released from the address allocation, or the addresses ADD of the remaining buffer areas except for the buffer area corresponding to the defect address D_ADD may be sequentially reset. In another example, when the second address A2 is labeled as the defect address D_ADD, the buffer area corresponding to the third address A3 may be designated as the second address A2. In some implementations, access to the defect address D_ADD may be blocked by various methods.

Figure 8:
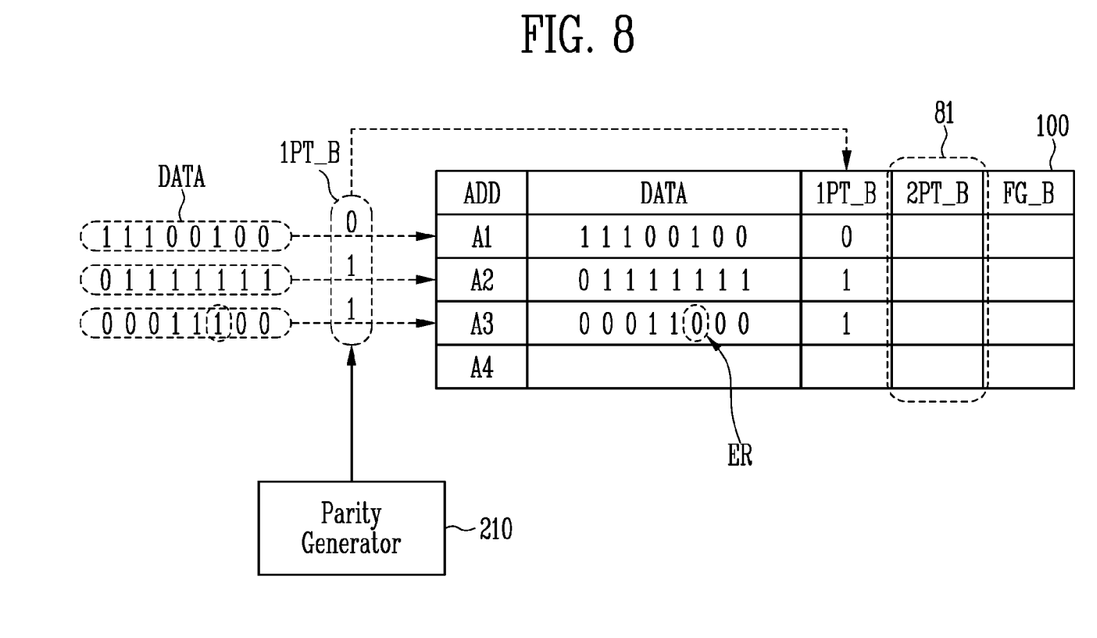
FIG. 8 is a diagram illustrating an example method of generating a parity bit for encoding data based on another embodiment of the disclosed technology.

FIG. 8 is a diagram illustrating an example method of generating a parity bit for encoding data based on an embodiment of the disclosed technology.

Referring to FIG. 8, the system buffer 100 may further include buffer areas 81 in which the second parity bit 2PT_B is additionally stored. When the data DATA is written to the memory system, the parity generator 210 may generate a first parity bit 1PT_B of the data DATA before the data DATA is written to the system buffer 100. For example, the parity generator 210 may generate the first parity bit 1PT_B of the data DATA written to the buffer areas for each address of the system buffer 100, and store the generated first parity bit 1PT_B in the buffer area corresponding to each address ADD.

For example, when data DATA 11100100 is written to the buffer area corresponding to a first address A1 of the system buffer 100, the parity generator 210 may generate the first parity bit 1PT_B corresponding to the first address A1 by counting the number of "1" bits included in the received data DATA. Since the number of "1" bits included in the data DATA 11100100 is four, the first parity bit 1PT_B corresponding to the first address A1 is 0. Therefore, the data DATA 11100100 and the first parity bit 1PT_B 0 may be stored in the buffer area corresponding to the first address A1.

For example, when data DATA 01111111 is written to the buffer area corresponding to a second address A2 of the system buffer 100, the parity generator 210 may generate the first parity bit 1PT_B corresponding to the second address A2 by counting the number of "1" bits included in the received data DATA. Since the number of "1" bits included in the data DATA 01111111 is seven, the first parity bit 1PT_B corresponding to the second address A2 is 1. Therefore, the data DATA 01111111 and the first parity bit 1PT_B 1 may be stored in the buffer area corresponding to the second address A2.

For example, when data DATA 00011100 is written to the buffer area corresponding to a third address A3 of the system buffer 100, the parity generator 210 may generate the first parity bit 1PT_B corresponding to the third address A3 by counting the number of "1" bits included in the received data DATA. Since the number of "1" bits included in the data DATA 00011100 is three, the first parity bit 1PT_B corresponding to the third address A3 is 1. Therefore, the data DATA 00011100 and the first parity bit 1PT_B 1 may be stored in the buffer area corresponding to the third address A3. However, when a defect exists in the buffer area corresponding to the third address A3, the data stored in the buffer area corresponding to the third address A3 includes an error bit ER. For example, when a defect occurs in a sixth buffer among a plurality of buffers allocated to the third address A3, the sixth bit of the original data "00011100" changes from "1" to "0." In this case, the data DATA corresponding to the third address A3 that is stored in the system buffer 100 is forwarded to the buffer area and the corrupted data "00011000" is stored in the buffer area, and the value "1" of the first parity bit 1PT_B generated by the parity generator 210 is also stored as it is.

The disclosed technology can be implemented in some embodiments to determine the existence of the error bit ER in the third address A3 as will be discussed below with reference to FIG. 9.

Figure 9:
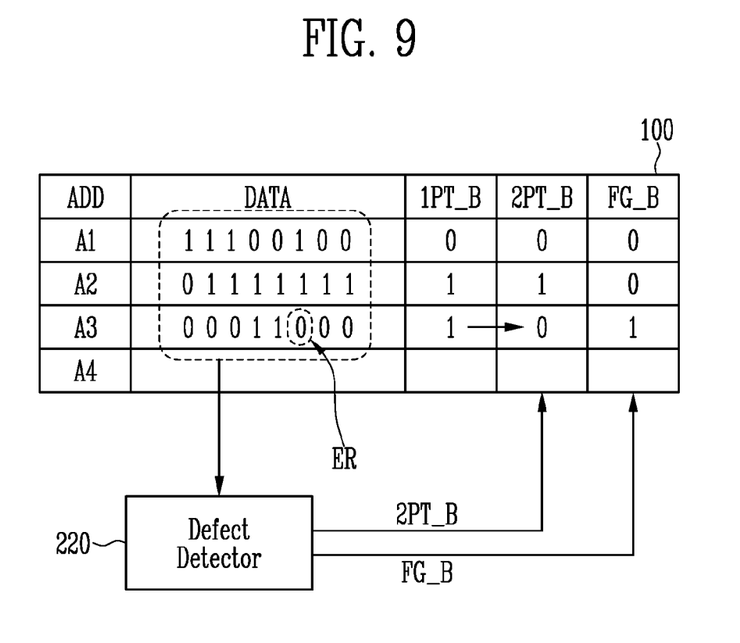
FIG. 9 is a diagram illustrating an example of how to detect a defect address based on another embodiment of the disclosed technology.

FIG. 9 is a diagram illustrating an example of how to detect a defect address based on another embodiment of the disclosed technology.

Referring to FIG. 9, the defect detector 220 may generate a second parity bit 2PT_B for the data DATA stored in the system buffer 100, and store the generated second parity bit 2PT_B in the system buffer 100. For example, the defect detector 220 may generate the second parity bit 2PT_B of the data DATA stored in the system buffer 100 for each address, store the second parity bit 2PT_B in the system buffer 100, and compare the first and second parity bits 1PT_B and 2PT_B stored in the system buffer 100. The defect detector 220 may store the flag bit FG_B corresponding to the flag bit "0" indicating that there is no defect in an address where the first parity bit 1PT_B and the second parity bit 2PT_B are the same, and may store the flag bit FG_B corresponding to the flag bit "1" indicating that there is a defect in an address where the first parity bit 1PT_B and the second parity bit 2PT_B are different from each other. In the example described with reference to FIG. 9, since the first parity bit 1PT_B 1 of the third address A3 is changed to 0 in the second parity bit 2PT_B, the flag bit FG_B of the third address A3 becomes "1," which is flag bit indicating that there is a defect.

Figure 10:
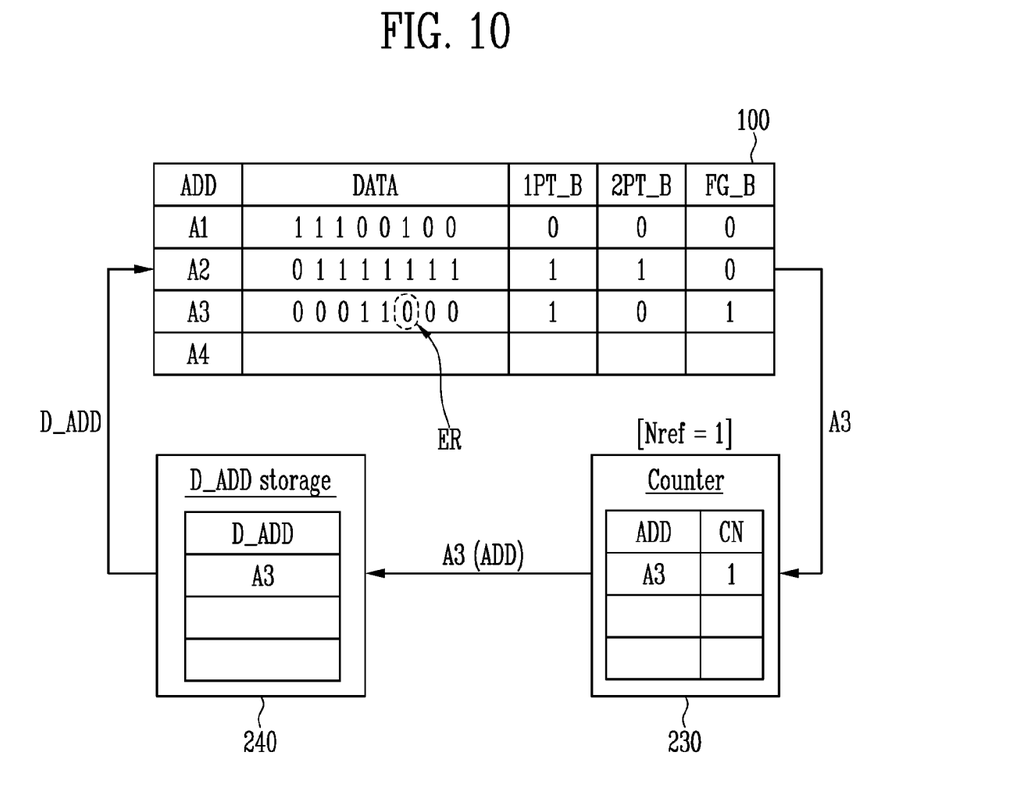
FIG. 10 is a diagram illustrating an example method of indicating the defect address based on another embodiment of the disclosed technology.

FIG. 10 is a diagram illustrating an example method of indicating the defect address based on another embodiment of the disclosed technology.

Referring to FIG. 10, the counter 230 may store the address ADD and the count CN based on the flag bit FG_B of the system buffer 100. For example, the counter 230 may store the address ADD where the flag bit FG_B stored in the system buffer 100 is the flag bit indicating that there is a defect, and may increase the count CN each time the address ADD stored in the defect address detection operation is detected. For example, assuming that the reference number Nref stored in the counter 230 is 1, in the defect address detection operation, when the number of the third address A3 is 1, the counter 230 may output the third address A3. That is, when the reference number Nref is set to 1, addresses that includes one or more erroneous bits is labeled as the defect address D_ADD.

The defect address storage 240 may store the address ADD output from the counter 230 and output the defect address D_ADD corresponding to the stored address. For example, when the third address A3 is output from the counter 230, the defect address storage 240 may store the third address A3 as the defect address D_ADD, and output the defect address D_ADD corresponding to the third address A3 to the system buffer 100. When the defect address D_ADD corresponding to the third address A3 is written to the system buffer 100, data input/output of the buffer area corresponding to the third address A3 of the system buffer 100 is inhibited.

Figure 11:
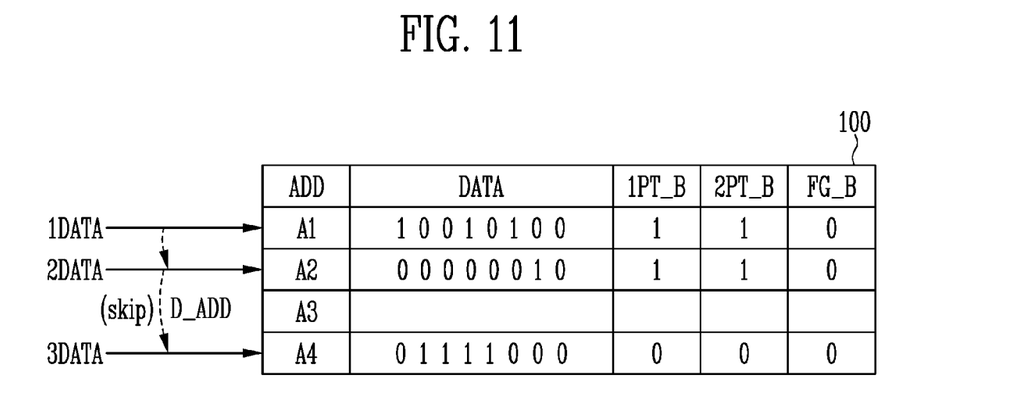
FIG. 11 is a diagram illustrating an example method of writing data to a system buffer that includes the defect address based on another embodiment of the disclosed technology.

FIG. 11 is a diagram illustrating an example method of writing data to the system buffer that includes the defect address based on another embodiment of the disclosed technology.

Referring to FIGS. 10 and 11, when the third address A3 of the system buffer 100 is labeled as the defect address D_ADD, the data DATA written to the system buffer 100 in a subsequent operation may be sequentially written to remaining addresses except for the third address A3. For example, first data 1DATA corresponding to the first address A1 may be stored in the buffer area to which the first address A1 is allocated, second data 2DATA following the first data 1DATA may be stored in the buffer area to which the second address A2 is allocated, and third data 3DATA input next to the second data 2DATA may be stored in a buffer area to which a fourth address A4 not the third address A3 is allocated. That is, after the third address A3 in the system buffer 100 is labeled as the defect address D_ADD in the system buffer 100, the third address A3 may be omitted and the remaining addresses are selected for data input/output operations. In other words, the third address A3 labeled as the defect address D_ADD may be replaced with the fourth address A4.

Figure 12:
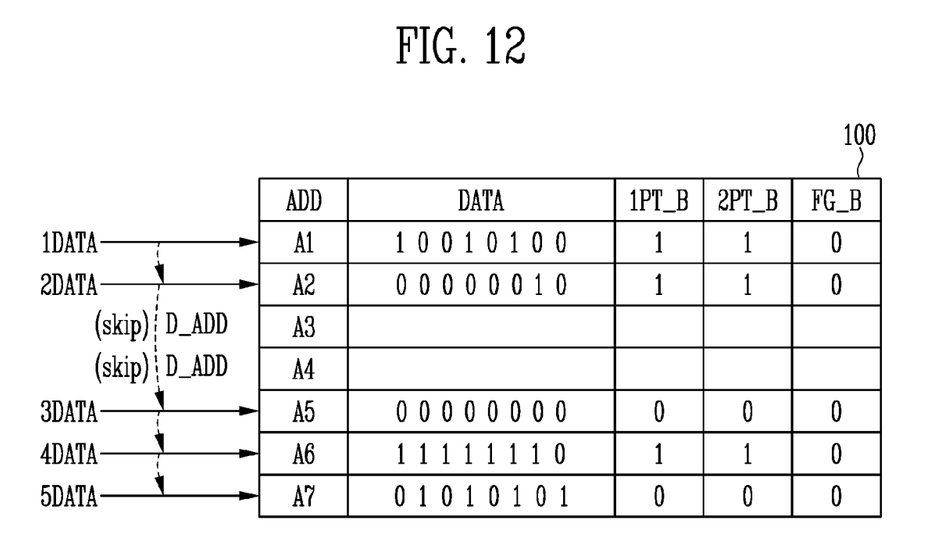
FIG. 12 is a diagram illustrating an example method of writing data to a system buffer that includes a defect address based on another embodiment of the disclosed technology.

FIG. 12 is a diagram illustrating an example method of writing data to a system buffer that includes a defect address based on another embodiment of the disclosed technology.

Referring to FIG. 12, a plurality of addresses ADD among the addresses ADD allocated to the system buffer 100 may be labeled as the defect address D_ADD. Even though the plurality of addresses ADD are labeled as the defect address D_ADD, input/output of data may be blocked only in the buffer area labeled as the defect address D_ADD.

For example, when data is input after the third and fourth addresses A3 and A4 are labeled as the defect address D_ADD, first and second data 1DATA and 2DATA may be stored in buffer areas to which first and second addresses A1 and A2 are allocated, and third to fifth data 3 to 5DATA may be stored in buffer areas to which fifth to seventh addresses A5 to A7 are allocated. In other words, the third address A3 labeled as the defect address D_ADD may be replaced with the fifth address A5, which is an address that does not include defects, and the fourth address A4 labeled as the defect address D_ADD may be replaced with the sixth address A6, which is as address that does not include defects.

Figure 13:
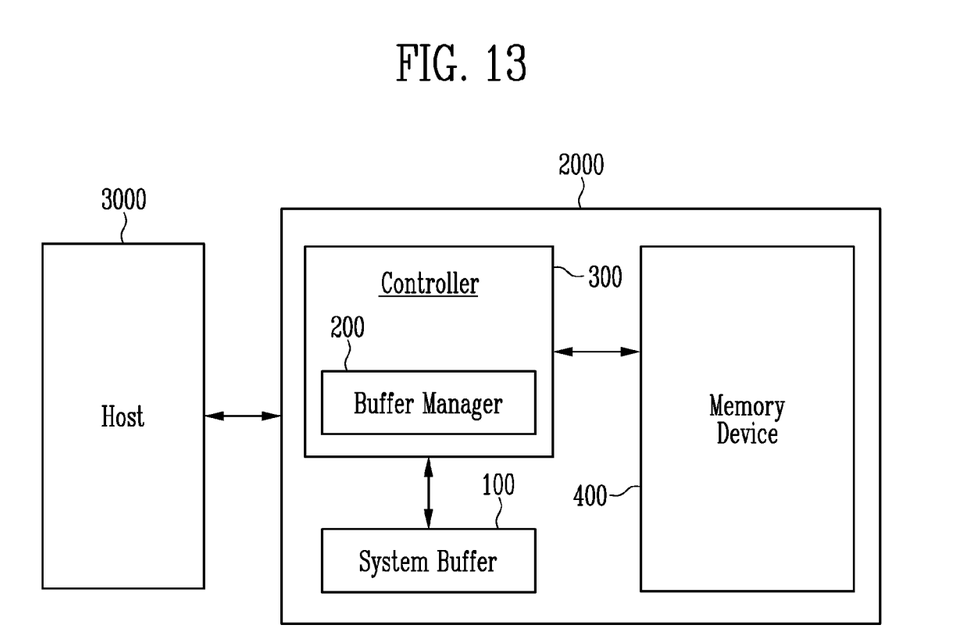
FIG. 13 is a diagram illustrating an example of a memory system based on an embodiment of the disclosed technology.

FIG. 13 is a diagram illustrating a memory system based on an embodiment of the disclosed technology.

Referring to FIG. 13, the memory system 2000 may include a system buffer 100, a controller 300, and a memory device 400.

The system buffer 100 may be configured as a memory for storing system data used in the memory system 2000 and may be configured identically to the system buffer 100 described with reference to FIG. 2. In FIG. 13, the system buffer 100 is disposed outside the controller 300. However, the system buffer 100 may be disposed inside the controller 300 according to the memory system 2000.

The controller 300 may be configured to communicate with a host 3000 and the memory device 400, and may be configured to control an overall operation of the memory system 2000. The controller 300 may include a buffer manager 200 for managing a defect address detected in the system buffer 100. The buffer manager 200 may be configured identically to the buffer manager 200 described with reference to FIG. 2.

The memory device 400 may be configured to store user data, and may be configured with a volatile or nonvolatile memory.

Figure 14:
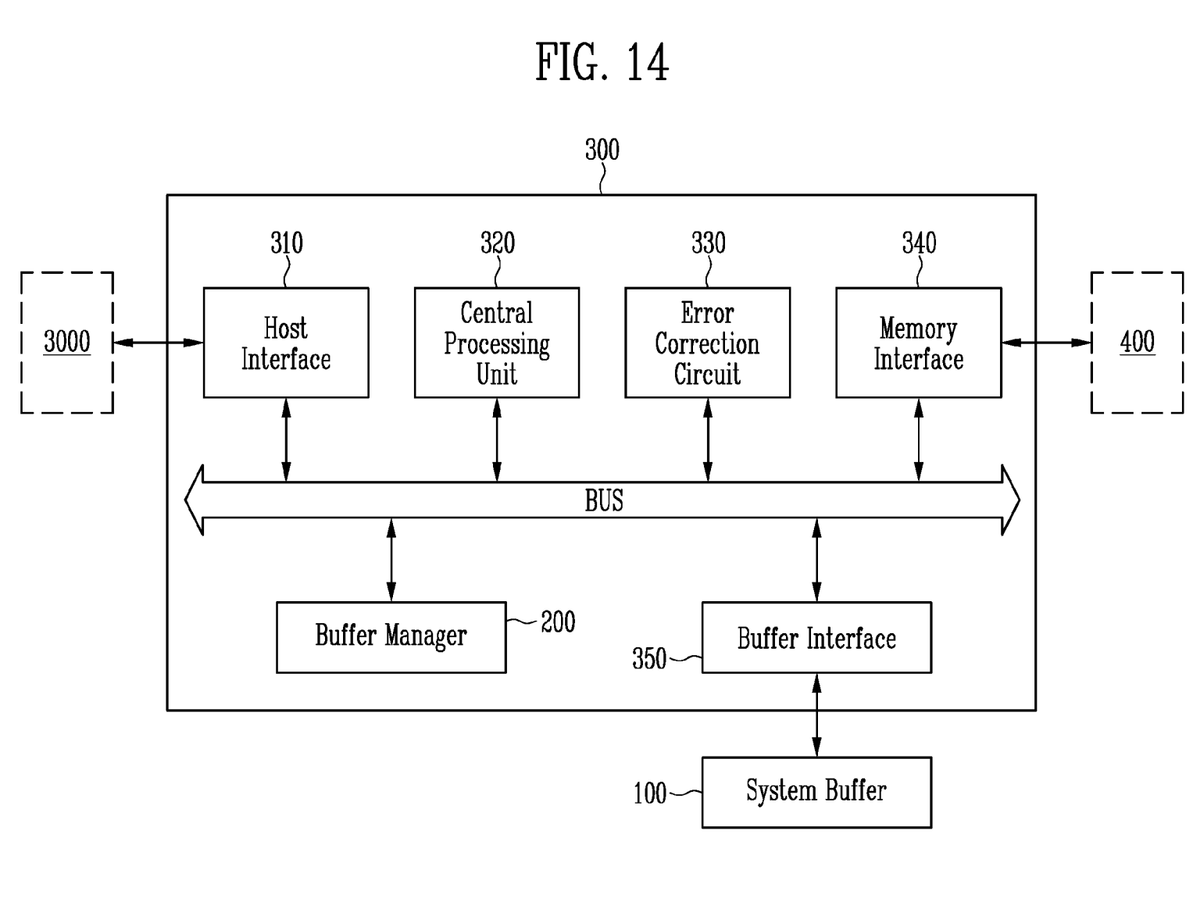
FIG. 14 is a diagram illustrating an example of a controller based on an embodiment of the disclosed technology.

FIG. 14 is a diagram illustrating an example of a controller based on an embodiment of the disclosed technology.

Referring to FIGS. 13 and 14, the controller 300 may include a host interface 310, a central processing unit 320, an error correction circuit 330, a memory interface 340, a buffer interface 350, and a buffer manager 200. The host interface 310, the central processing unit 320, the error correction circuit 330, the memory interface 340, the buffer interface 350, and the buffer manager 200 may communicate with each other through a bus.

The host interface 310 may be configured to transmit a received request to the central processing unit 320 and transmit data DATA between the host 3000 and the controller 300 when the request output from the host 3000 is received.

The central processing unit 320 may include software and hardware capable of controlling an overall operation of the controller 300. In addition, the central processing unit 320 may perform a background operation to improve or manage performance of the memory system 2000 even though the request from the host 3000 does not exist. The central processing unit 320 may input/output data through the system buffer 100 during a program or read operation by the request of the host 3000 or a background operation by the request of the host 3000. When data is input/output from the system buffer 100, the buffer manager 200 may be activated to determine whether the system buffer 100 is defective and block access to an address where the defect occurs.

The error correction circuit 330 may be configured to detect an error of data transmitted through the bus during the program or read operation and recover the detected error. For example, the error correction circuit 330 may encode data received from the host 3000 during the program operation and decode data received from the memory device 400 during the read operation.

The memory interface 340 may be configured to transmit a command, an address, or data between the controller 1200 and the memory device 400. When the program operation is described as an example, the memory interface 340 may transmit a program command, an address, and data to the memory device 400.

The buffer interface 350 may be configured to transmit data between the system buffer 100 and the controller 300. For example, data output from the host 3000 or the memory device 400 may be temporarily stored in the system buffer 100 through the bus and the buffer interface 350, and data output from the system buffer may be output to the bus through the buffer interface 350.

The buffer manager 200 may be configured to detect a defect address of the system buffer 100 and block access to the defect address. The buffer manager 200 may be configured identically to the buffer manager 200 shown in FIG. 2.

Figure 15:
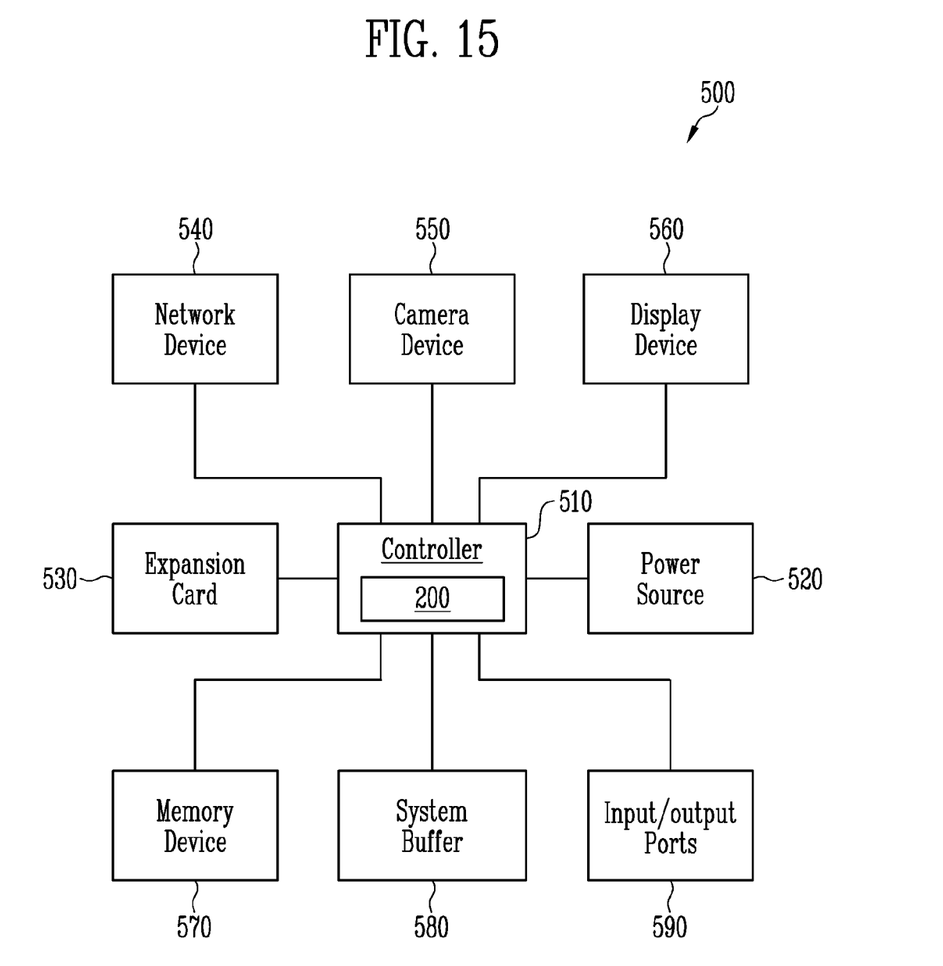
FIG. 15 is a diagram illustrating an example of an electronic system based on an embodiment of the disclosed technology.

FIG. 15 is a diagram illustrating an example of an electronic system based on an embodiment of the disclosed technology.

Referring to FIG. 15, the electronic system 500 may include a controller 510, a power source 520, an expansion card 530, a network device 540, a camera device 550, a display device 560, a memory device 570, a system buffer 580, and input/output ports 590.

The controller 510 may control operations of each of the elements 520 to 590. The power source 520 may supply a voltage to at least one of the elements 510 and 530 to 580.

The expansion card 530 may be implemented with a secure digital (SD) card or a multimedia card (MMC). According to an embodiment, the expansion card 530 may be a subscriber identification module (SIM) card or a universal subscriber identity module (USIM) card. The network device 540 may be configured to connect the electronic system 500 to a wired network or a wireless network. The camera device 550 may be configured to convert an optical image into an electrical image. The electrical image output from the camera device 550 may be stored in the memory device 570, the system buffer 580, or the expansion card 530. In addition, the electrical image output from the camera device 550 may be displayed through the display device 560.

The display device 560 may be configured to display data output from the expansion card 530, the network device 540, the memory device 570, the system buffer 580, or the input/output ports 590. The memory device 570 may be implemented with a hard disk drive or a solid state drive (SSD). The input/output ports 590 may be configured to transmit data to the electronic system 500 or to transmit data output from the electronic system to an external device. For example, the input/output ports 590 may be a port for connecting a pointing device such as a computer mouse, a port for connecting a printer, or a port for connecting a USB drive.

The controller 510 may include the buffer manager 200 similarly to the controller 300 described with reference to FIG. 14, and may manage a defect address of the system buffer 580 or the expansion card 530 through the buffer manager 200.

Only a few implementations and examples are described. Enhancements and variations of what is described and other implementations can be made based on what is described and illustrated in this patent document.

What is claimed is:

1. A memory system comprising:
a system buffer including buffer areas to which addresses are allocated, and configured to store data in the buffer areas; and
a controller configured to:
extract a first parity bit for data to be stored in the system buffer and a second parity bit from the data stored in the buffer areas;
generate a flag bit according to a comparison between the first parity bit and the second parity bit;
increase a count of an address corresponding to a first flag bit indicating that a defect occurs in a buffer area in which the data is stored, in response to generating the first flag bit as the flag bit;
determine, among the addresses, the address as a defect address when the count of the address is equal to or greater than a reference number; and
block access to the buffer area corresponding to the defect address,
wherein the controller comprises:
a counter configured to store the count associated with the address corresponding to the first flag bit, and output the defect address; and
a defect address storage coupled to the counter and configured to store the defect address output from the counter.

2. The memory system of claim 1, wherein the system buffer includes at least one of a static random access memory (SRAM), a dynamic random access memory (DRAM), a NAND memory, or a combination of two or more of the SRAM, DRAM, and NAND memory.

3. The memory system of claim 1, wherein the controller stores the first parity bit and the flag bit in the system buffer.

4. The memory system of claim 3, wherein the controller is configured to count a number of selected bits of the data to be written to the system buffer, and generate the first parity bit based on a counted value.

5. The memory system of claim 4, wherein the controller is configured to generate a first value as the first parity bit in a case that the counted value is an odd number, and generate a second value as the first parity bit in a case that the counted value is an even number.

6. The memory system of claim 3, wherein the controller is configured to count a number of selected bits of the data written to the system buffer, generate the second parity bit based on a counted value, and determine whether the second parity bit matches the first parity bit.

7. The memory system of claim 6, wherein the controller is configured to generate a second flag bit indicating that there is no defect, as the flag bit, in a case that the second parity bit matches the first parity bit, and generate the first flag bit indicating that there is a defect, as the flag bit, in a case that the second parity bit does not match the first parity bit.

8. The memory system of claim 3, wherein the controller is configured to detect an error bit using a hamming code for the data stored in the system buffer, and store the flag bit corresponding to the first flag bit indicating that there is a defect in a buffer area corresponding to the address where the error bit is detected.

9. The memory system of claim 3, wherein the counter is configured to store the reference number set as a natural number greater than or equal to one, store the address corresponding to the flag bit indicating that there is a defect, and count a number of detections of the address corresponding to the first flag bit indicating that there is a defect.

10. The memory system of claim 3, wherein the defect address storage is configured to store a plurality of addresses as a plurality of defect addresses in a case that the counter generates the plurality of addresses, and block access to buffer areas corresponding to the plurality of defect addresses in the system buffer.

11. The memory system of claim 3, wherein the system buffer further includes buffer areas configured to store the second parity bit generated by the controller.

12. The memory system of claim 1, wherein the controller replaces the defect address with an address of a buffer area that does not include a defect.

13. A memory system comprising:
a system buffer including buffer areas configured to store data to be forwarded or accessed, wherein addresses are allocated to the buffer areas; and
a controller configured to:
detect an address that includes a defect using a parity or a hamming code for data written to the system buffer, or using the hamming code that uses the parity; and
block access to the detected address,
wherein the controller performs a defect address detection operation using the hamming code on at least one address in response to a result of using the parity indicating that the at least one address includes a defect.

14. The memory system of claim 13, wherein the controller is configured to omit performing the defect address detection operation in response to the result of using the parity indicating that there is no address that includes a defect.

15. A method of operating a memory system, the method comprising:
storing, by a system buffer, data in buffer areas included in the system buffer;
generating, by a controller, a first parity bit for data before being stored in the system buffer;
generating, by the controller, a second parity bit from the data stored in the buffer areas;
generating, by the controller, a flag bit according to a comparison between the first parity bit and the second parity bit;
increasing, by a counter of the controller, a count of an address corresponding to a first flag bit indicating that a defect occurs in a buffer area in which the data is stored, in response to generating the first flag bit as the flag bit;

storing, by the counter of the controller, the count associated with the address corresponding to the first flag bit;

determining, by the counter of the controller, the address as a defect address when the count of the address is equal to or greater than a reference number;

storing, by a defect address storage of the controller, the defect address output from the counter; and blocking, by the defect address storage of the controller, access to the buffer area corresponding to the defect address.

16. The method of claim 15, wherein the first parity bit is generated as a first value in a case that a number of selected bits included in the data before being stored in the system buffer is an odd number, and is generated as a second value in a case that the number of selected bits included in the data before being stored in the system buffer is an even number.

17. The method of claim 16, wherein the second parity bit is generated as the first value in a case that the number of selected bits included in the data stored in the system buffer is an odd number, and is generated as the second value in a case that the number of selected bits included in the data stored in the system buffer is an even number.

18. The method of claim 15, wherein labeling determining the address as the defect address comprises:

setting the reference number;

determining whether a number of instances where values of the first and second parity bits are different from each other is equal to or greater than the reference number; and labeling the corresponding address as the defect address when the number of instances where the values of the first and second parity bits are different from each other is equal to or greater than the reference number.

19. The method of claim 18, wherein the reference number is set as a natural number greater than or equal to one.

20. The method of claim 15, further comprising, after blocking access to the buffer area corresponding to the defect address:

replacing the defect address with an address of a buffer area that does not include a defect.

* * * * *